(12) United States Patent
Chatterjee et al.

(10) Patent No.: US 8,521,685 B1
(45) Date of Patent: Aug. 27, 2013

(54) BACKGROUND MOVEMENT OF DATA BETWEEN NODES IN A STORAGE CLUSTER

(75) Inventors: Paresh Chatterjee, Fremont, CA (US); Anandh Mahalingam, Fremont, CA (US); Narayanan Balakrishnan, Chennai (IN); Srikumar Subramanian, Newark, CA (US)

(73) Assignee: American Megatrends, Inc., Norcross, GA (US)

( * ) Notice: Subject to any disclaimer, the term of this patent is extended or adjusted under 35 U.S.C. 154(b) by 0 days.

(21) Appl. No.: 13/220,299

(22) Filed: Aug. 29, 2011

Related U.S. Application Data

(60) Division of application No. 12/857,050, filed on Aug. 16, 2010, now Pat. No. 8,010,485, which is a continuation-in-part of application No. 11/551,303, filed on Oct. 20, 2006, now Pat. No. 7,778,960.

(60) Provisional application No. 60/728,667, filed on Oct. 20, 2005.

(51) Int. Cl.
*G06F 17/30* (2006.01)

(52) U.S. Cl.
USPC .......................................... 707/609; 707/802

(58) Field of Classification Search
None
See application file for complete search history.

(56) References Cited

U.S. PATENT DOCUMENTS

| | | | |
|---|---|---|---|
| 5,488,716 A | 1/1996 | Schneider et al. | |
| 6,173,377 B1 | 1/2001 | Yanai et al. | |
| 6,591,347 B2 | 7/2003 | Tischler et al. | |
| 6,671,705 B1 | 12/2003 | Duprey et al. | |
| 7,051,165 B2 | 5/2006 | Kimura et al. | |
| 7,398,382 B2 | 7/2008 | Rothman et al. | |
| 7,664,793 B1 | 2/2010 | Kekre et al. | |
| 7,908,448 B1 | 3/2011 | Chatterjee et al. | |
| 7,996,608 B1 | 8/2011 | Chatterjee et al. | |
| 2001/0049771 A1 | 12/2001 | Tischler et al. | |
| 2003/0126242 A1 | 7/2003 | Chang | |
| 2003/0142561 A1 | 7/2003 | Mason et al. | |
| 2003/0158862 A1 | 8/2003 | Eshel et al. | |
| 2004/0039888 A1* | 2/2004 | LeCrone et al. | 711/162 |
| 2004/0044865 A1 | 3/2004 | Sicola et al. | |
| 2004/0073831 A1* | 4/2004 | Yanai et al. | 714/7 |
| 2004/0186898 A1 | 9/2004 | Kimura et al. | |

(Continued)

OTHER PUBLICATIONS

U.S. Official Action, dated Nov. 16, 2011, received in connection with related U.S. Appl. No. 13/046,857.

(Continued)

*Primary Examiner* — S Hasan
(74) *Attorney, Agent, or Firm* — Meunier Carlin & Curfman, LLC

(57) ABSTRACT

A method, system, apparatus, and computer-readable medium are described for the background movement of data between nodes in a storage cluster. According to one method, exception tables are generated that include data identifying the areas on each node that need to be migrated to another node and the areas on each node that are to be migrated from another node. The exception tables may be generated in response to the failure of a node in the storage cluster or in other circumstances. A background resynchronization thread utilizes the contents of the exception tables to migrate data between the nodes of the cluster, thereby synchronizing the data stored on the nodes. Input/output operations directed to an area that is to be migrated from another node are redirected to the other node in accordance with a timeout period associated with the input/output operations.

5 Claims, 11 Drawing Sheets

(56) References Cited

U.S. PATENT DOCUMENTS

| | | |
|---|---|---|
| 2004/0255189 A1 | 12/2004 | Chu et al. |
| 2005/0044346 A1 | 2/2005 | Cronk et al. |
| 2005/0071389 A1 | 3/2005 | Gupta |
| 2005/0216538 A1 | 9/2005 | Douceur et al. |
| 2005/0273645 A1 | 12/2005 | Satran et al. |
| 2005/0283575 A1 | 12/2005 | Kobayashi et al. |
| 2006/0117212 A1 | 6/2006 | Meyer et al. |
| 2006/0143432 A1 | 6/2006 | Rothman et al. |
| 2006/0184731 A1 | 8/2006 | Corbett et al. |
| 2006/0236064 A1 | 10/2006 | Niles et al. |
| 2006/0288202 A1 | 12/2006 | Doran et al. |
| 2007/0283348 A1 * | 12/2007 | White ............................... 718/1 |
| 2008/0016301 A1 | 1/2008 | Chen et al. |
| 2008/0046612 A1 | 2/2008 | Beardsley et al. |
| 2008/0104107 A1 | 5/2008 | Schwaab et al. |
| 2009/0037679 A1 * | 2/2009 | Kaushik et al. ................ 711/162 |

OTHER PUBLICATIONS

U.S. Official Action, dated Dec. 6, 2011, received in connection with related U.S. Appl. No. 12/013,124.

U.S. Official Action, dated Jan. 10, 2012, received in connection with related U.S. Appl. No. 13/242,259.

U.S. Official Action dated Jul. 22, 2011 in U.S. Appl. No. 12/355,439.

* cited by examiner

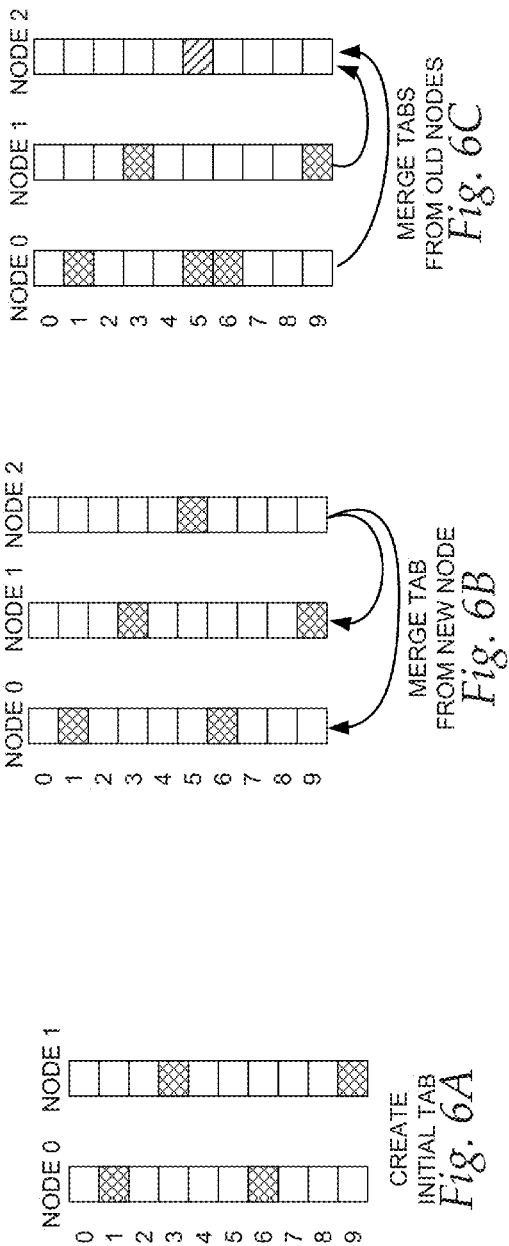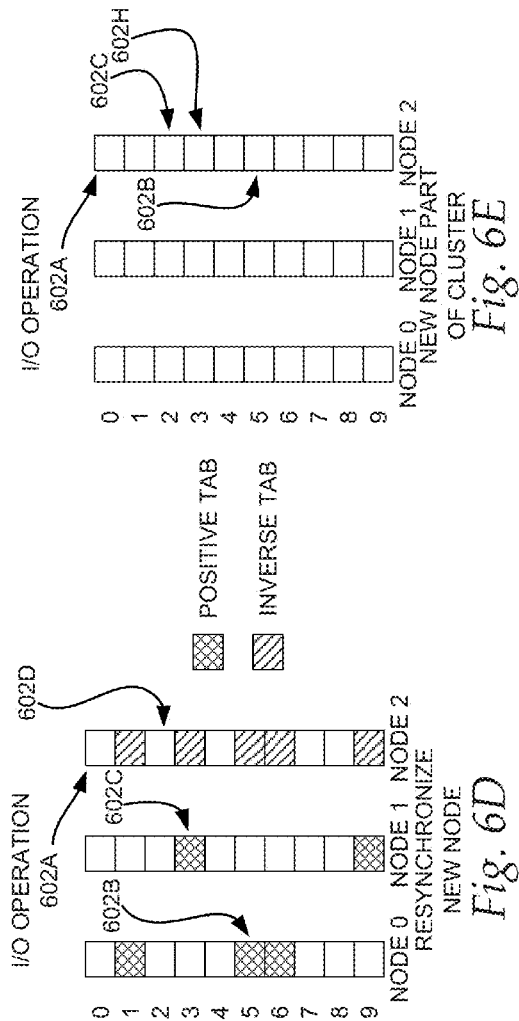

BACKGROUND MOVEMENT OF DATA BETWEEN NODES IN A STORAGE CLUSTER

CROSS-REFERENCE TO RELATED APPLICATIONS

This application is a division of U.S. patent application Ser. No. 12/857,050, filed on Aug. 16, 2010, entitled "Background Movement of Data Between Nodes in a Storage Cluster," which is a continuation-in-part of U.S. patent application Ser. No. 11/551,303, filed on Oct. 20, 2006, entitled "Background Movement of Data Between Nodes in a Storage Cluster," and claims the benefit of U.S. provisional patent application No. 60/728,667, filed on Oct. 20, 2005, and entitled "A Novel Method of Background Movement of Data Between Nodes in a Storage Cluster," which are expressly incorporated herein by reference in their entireties.

TECHNICAL FIELD

The disclosure provided herein relates generally to the field of storage systems consisting of multiple storage nodes and, more particularly, to the field of moving data between storage servers.

BACKGROUND

Scalability is an important requirement in all data storage systems. Different types of storage systems provide diverse methods of seamless scalability through capacity expansion. In some storage systems, such as systems utilizing redundant array of inexpensive disk ("RAID") controllers, it is often possible to add disk drives (or other types of mass storage devices) to a storage system while the system is in operation. In such a system, the RAID controller re-stripes existing data onto the new disk and makes the capacity of the other disks available for new input/output ("I/O") operations. This methodology, known as "vertical capacity expansion," is common. However, this methodology has at least one drawback in that it only scales data storage capacity, without improving other performance factors such as the processing power, main memory, or bandwidth of the system.

In other data storage systems, it is possible to add capacity by "virtualization." In this type of system, multiple storage servers are utilized to field I/O operations independently, but are exposed to the initiator of the I/O operation as a single device, called a "storage cluster." Each storage server in a cluster is called a "storage node" or just a "node." When data storage capacity becomes low, a new server may be added as a new node in the data storage system. In addition to contributing increased storage capacity, the new storage node contributes other computing resources to the system, leading to true scalability. This methodology is known as "horizontal capacity expansion." Some storage systems support vertical expansion of individual nodes, as well as horizontal expansion by the addition of storage nodes.

Systems implementing horizontal capacity expansion may choose to concatenate the capacity that is contributed by each node. However, in order to achieve the maximum benefit of horizontal capacity expansion, it is necessary to stripe data across the nodes in much the same way as data is striped across disks in RAID arrays. While striping data across nodes, the data should be stored in a manner that ensures that different I/O operations are fielded by different nodes, thereby utilizing all of the nodes simultaneously. It is also desirable not to split I/O operations between multiple nodes, so that the I/O latency is low. Striping the data in this manner provides a boost to random I/O performance without decreasing sequential I/O performance. The stripe size is calculated with this consideration, and is called the "zone size."

When data is striped across multiple nodes, the process of re-striping data when a new node is added is lengthy and inefficient in most contemporary storage systems. In particular, current storage systems require the movement of a massive amount of data in order to add a new node. As an example, in order to expand a four node cluster to a five node cluster using current data migration methodologies, only one in twenty storage zones (referred to herein as "zones") remains on the same node, and even those zones are in a different physical position on the node. Hence, the current process of migration is effectively a process of reading the entire body of data in the system according to its unexpanded configuration, and then writing it in its entirety according to expanded configuration of the cluster.

Such a migration process typically takes several days. During this time, the performance of the cluster is drastically decreased due to the presence of these extra migration I/O operations. A complicated method of locking is also required to prevent data corruption during the data migration process. The storage capacity and processing resources of the newly added node also do not contribute to the cluster until the entire migration process has completed; if an administrator is expanding the node in order to mitigate an impending capacity crunch, there is a good likelihood that the existing capacity will be depleted before the migration completes. In all cases, the migration process is cumbersome, disruptive and tedious.

It is with respect to these considerations and others that the following disclosure is presented.

SUMMARY

A system, method, apparatus, and computer-readable medium are described for moving data between the storage nodes of a storage cluster. According to aspects described herein, data may be moved between the storage nodes in a storage cluster efficiently and rapidly in the background, while minimizing performance degradation during the process. Data may be migrated between nodes in this manner to perform various cluster operations, including rebuild, resynchronization, expansion, migration, reconfiguration, compaction, and others.

According to one method provided herein, an exception table is created for a storage node. The exception table (also referred to herein simply as the "tab") is a data structure that includes data identifying the areas of the storage node that need to be migrated to another storage node. This portion of the data structure is called the positive tab. The exception table may also include data identifying the areas of a storage node that need to be migrated from another storage node. This portion of the data structure is called the inverse tab. The exception table may be created, for instance, in response to determining that one storage node in a storage cluster has failed.

In order to migrate data between nodes, such as for instance during a cluster rebuild operation, a background process (also referred to herein as a "thread") is executed. The background process utilizes the data contained within the exception table to migrate data between the storage nodes of the storage cluster. In particular, in one implementation, the background process utilizes the exception table to identify an area of a source storage node that needs to be migrated to a destination storage node. The background process then locks the area on the source node to be migrated. By locking the area, any input/output ("I/O") operations directed to the area are queued until the migration of the area has completed. There is no need to lock the area on the destination storage node because, as will be described below, I/O operations received at the destination node for the area will be redirected to the source node until the migration has been completed.

Once the area to be migrated has been locked, the contents of the area are copied to a buffer. The buffer is then written to the corresponding area on the destination node. Once the write operation has completed, the exception table is altered to indicate that the source node no longer needs to migrate the area to the destination node and that the destination node no longer needs to migrate the area from the source node. The lock is also removed from the area at the source node. Depending upon the type of migration operation being performed, pending I/O operations for the migrated area may be redirected to the destination storage node.

According to other aspects provided herein, the storage node may begin to function in a normal fashion even before the data migration has been completed. For instance, during a rebuild operation, a newly added storage node may begin to field I/O operations even before the node has been completely rebuilt. In order to provide this functionality, the exception tables are utilized to identify the particular storage node that should field an incoming I/O request. In particular, when an I/O request is received at a first node that is directed toward an area of a second node, the exception tables are referenced to determine if the area needs to be migrated from the first node to the second node. If so, the I/O operation is forwarded to the second node for fielding. In this manner, I/O operations directed to areas of a storage node that have not yet been rebuilt are redirected to another storage node that contains valid data for the area.

When an I/O request is received at a first node that is directed toward an area of a second node that does not need to be migrated, as indicated by the tab, the I/O operation is fielded locally at the first node. In this manner, I/O requests for the already migrated portions of a storage node that is being rebuilt will be handled by the node locally without forwarding to another node. When I/O operations are received by a node that are directed toward areas of the node that must be migrated to another node, as indicated by the tab, the I/O operations are forwarded to the other node for handling. If the tab indicates that the requested area does not need to be migrated to the other node, the node fields the I/O operations locally. I/O operations can be processed in this manner while the background thread is performing its processing.

The above-described aspects, and other aspects described herein, may also be implemented as a computer-controlled apparatus, a computer process, a computing system, an apparatus, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the embodiments presented herein, will be apparent from a reading of the following detailed description and a review of the associated drawings.

BRIEF DESCRIPTION OF THE DRAWINGS

FIGS. 6A-6E are block diagrams showing an illustrative sequence of operations for creating and sharing exception table data between the storage nodes of a storage cluster in one implementation;

DETAILED DESCRIPTION

Figure 1:
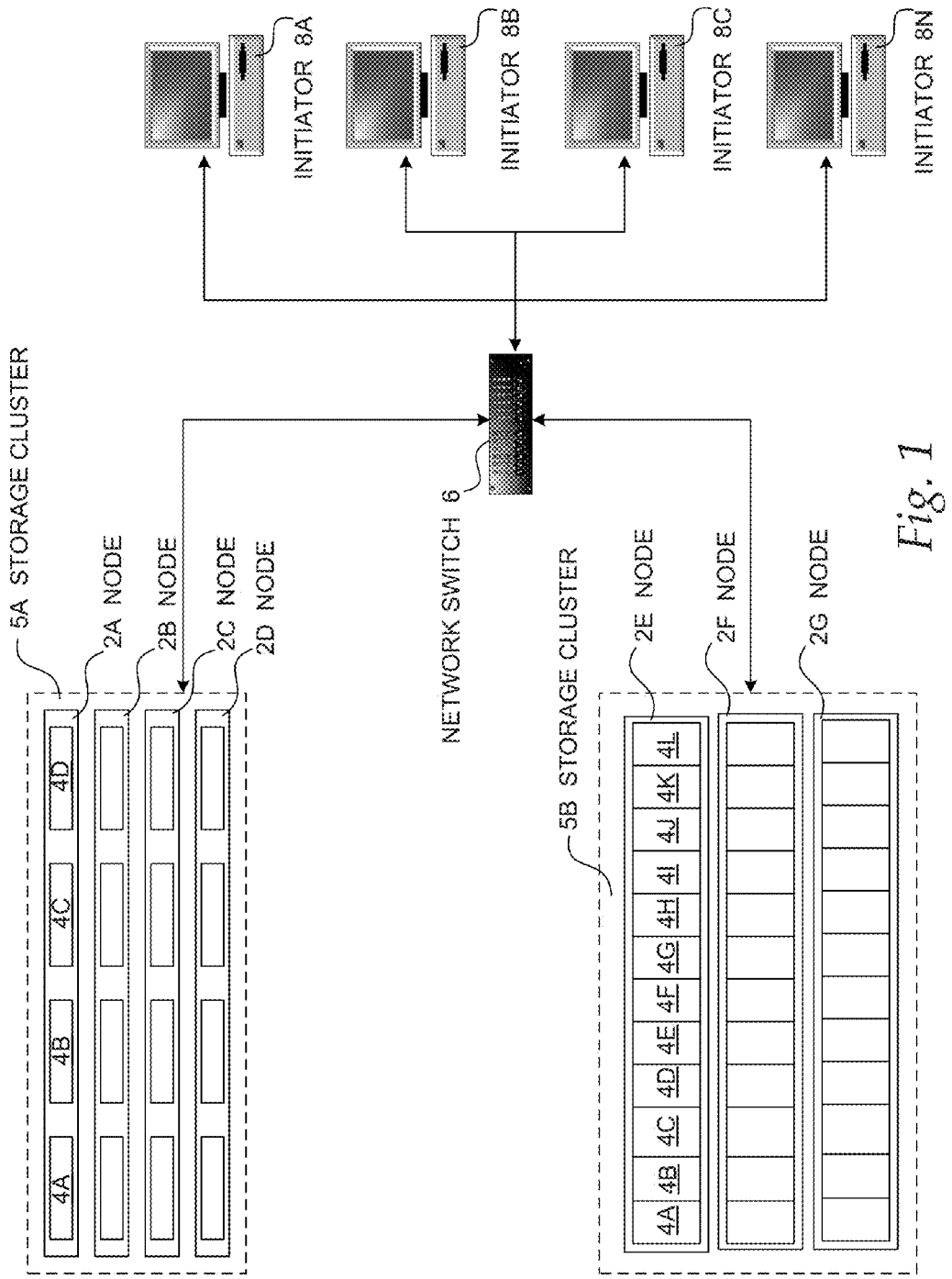
FIG. 1 is a computer architecture and network diagram showing aspects of a computer network and a storage server computer that provides an operating environment for embodiments of the disclosure presented herein.

In the following detailed description, references are made to the accompanying drawings that form a part hereof, and in which are shown by way of illustration specific embodiments or examples. Referring now to the drawings, in which like numerals represent like elements through the several figures, aspects of an illustrative operating environment will be described.

Figure 2:
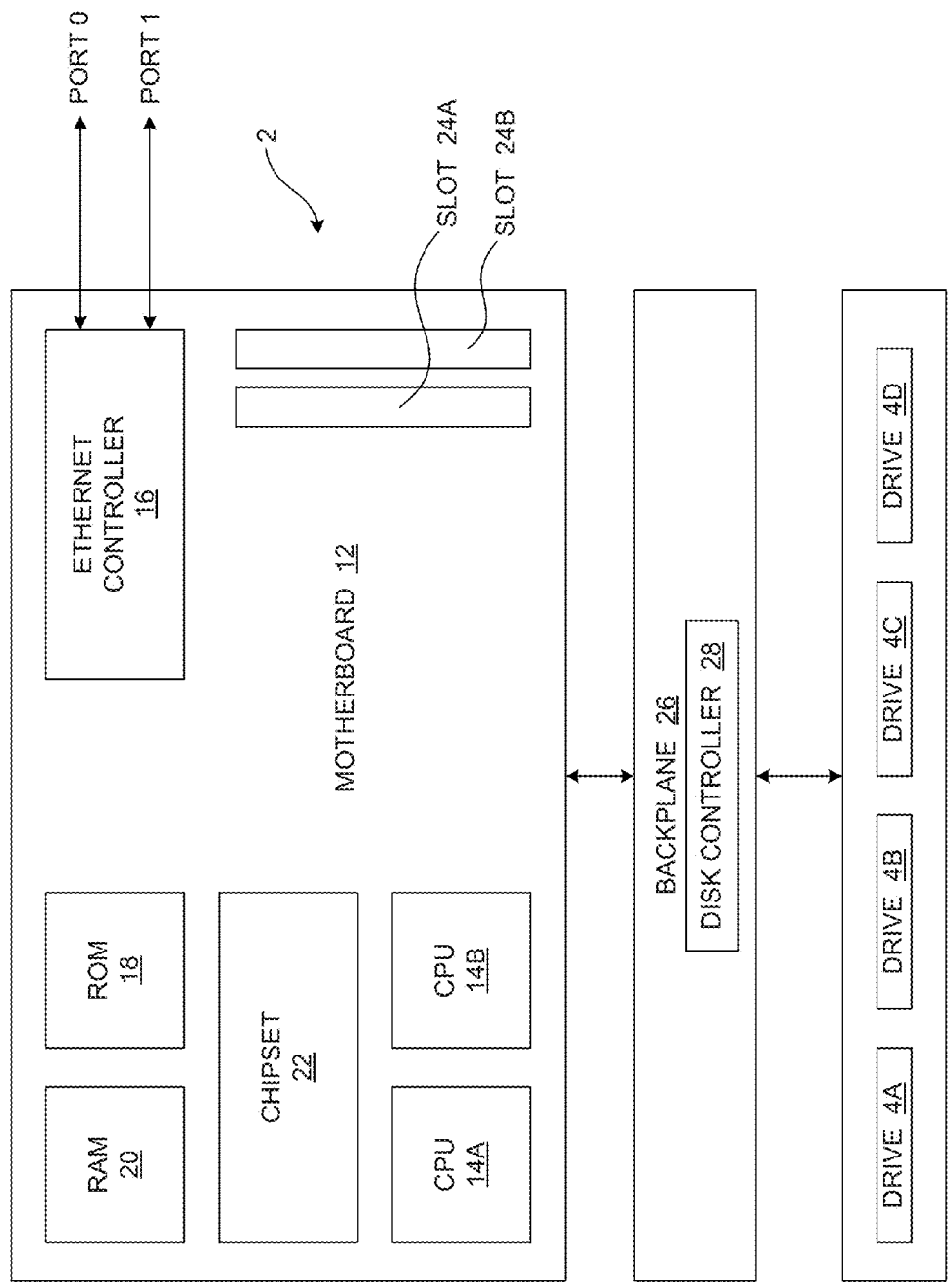
FIG. 2 is a computer architecture diagram illustrating aspects of the hardware of an illustrative storage server computer described herein.
Figure 3:
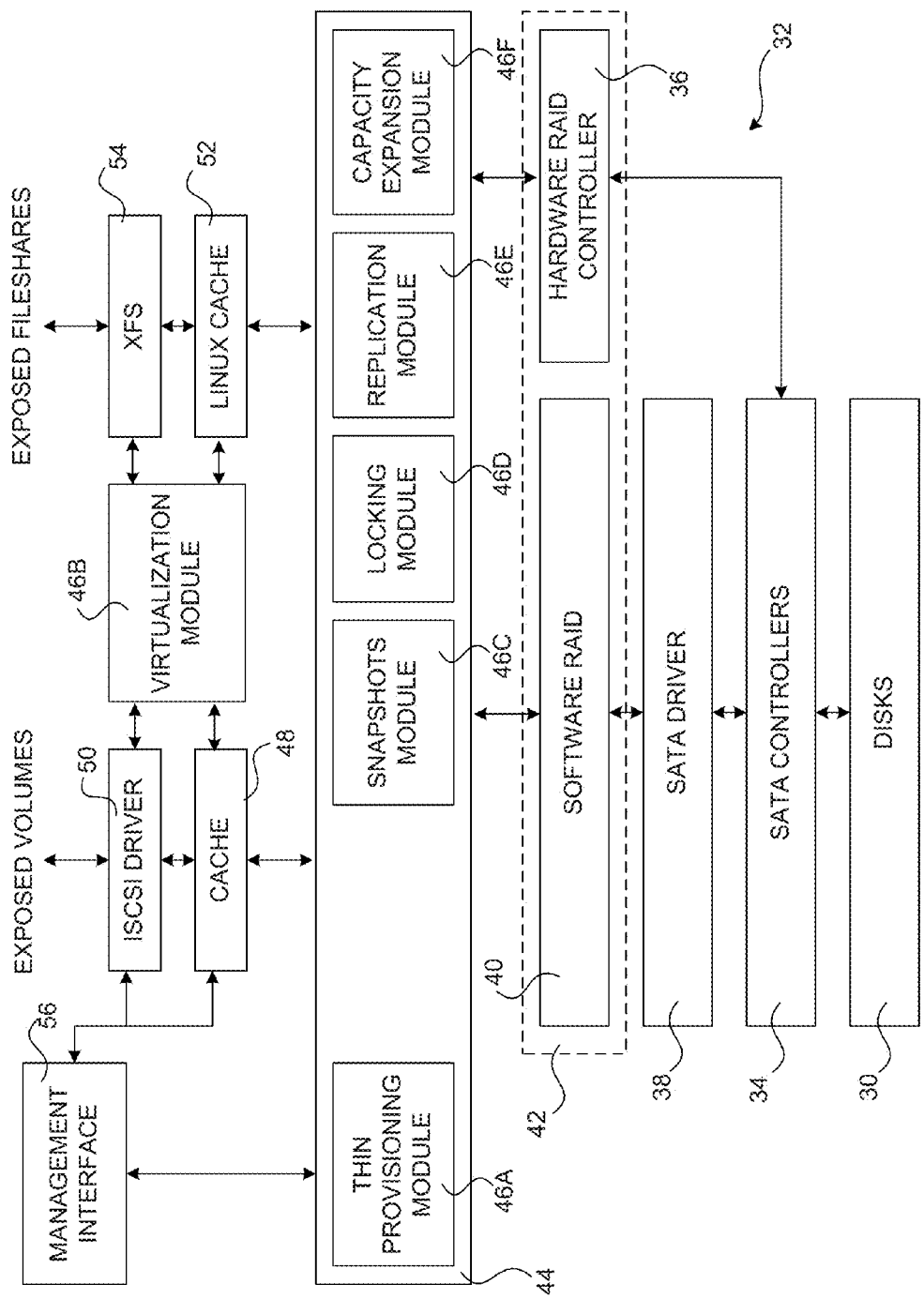
FIG. 3 is a software architecture diagram illustrating various aspects of a storage stack utilized by a storage server described herein.

FIGS. 1-3 and the following discussion are intended to provide a brief, general description of a suitable computing environment in which the embodiments described herein may be implemented. Generally, program modules include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices. While the implementations presented herein will be described in the general context of program modules that execute in conjunction with an operating system on a computer system, those skilled in the art will recognize that they may also be implemented in combination with other program modules.

Referring now to FIG. 1, an illustrative operating environment for the various implementations described herein will be disclosed. As shown in FIG. 1, the embodiments presented herein may be implemented in the storage server computers 2A-2G (also referred to herein as "storage nodes" or a "node") that are operative to read and write data to one or more mass storage devices, such as hard disk drives. According to implementations, the storage server computers 2A-2G may be housed in a one rack space unit storing up to four hard disk drives. For instance, the node 2A includes the hard disk drives 4A-4D. Alternatively, each node may be housed in a three rack space unit storing up to fifteen hard disk drives. For instance, the node 2E includes the hard disk drives 4A-4L. Other types of enclosures may also be utilized that store fewer or more hard disk drives. In this regard, it should be appreciated that the type of storage enclosure and number of hard disk drives utilized is not generally significant to the implementation of the embodiments described herein. Any type of storage enclosure and virtually any number of hard disk devices or other types of mass storage devices may be utilized.

As shown in FIG. 1, multiple storage nodes may be configured together as a virtualized storage cluster. For instance, the nodes 2A-2D have been configured as a storage cluster 5A and the nodes 2E-2G have been configured as a storage cluster 5B. In this configuration, each of the storage nodes 2A-2G is utilized to field I/O operations independently, but are exposed to an initiator of an I/O operation as a single device. It should be appreciated that a storage cluster may include any number of storage nodes.

When data storage capacity becomes low on a storage cluster, additional capacity may be added to the cluster through the addition of a new storage node to the cluster or by adding additional mass storage devices to an existing storage node in the cluster. As discussed briefly above, the addition of a new storage node to a cluster not only increases the storage capacity of the cluster, but also contributes other computing resources to the system, leading to true scalability. This methodology is known as "horizontal capacity expansion." The implementations described herein are primarily concerned with the addition of storage capacity to a storage cluster through the addition of a new storage node.

In order to achieve the maximum benefit of horizontal capacity expansion, data is striped across the nodes of each storage cluster. For instance, the cluster 5A may stripe data across the storage nodes 2A, 2B, 2C, and 2D. The cluster 5B may stripe data across the storage nodes 2E, 2F, and 2G. Striping data across nodes generally ensures that different I/O operations are fielded by different nodes, thereby utilizing all of the nodes simultaneously, and that the same I/O operation is not split between multiple nodes. Striping the data in this manner provides a boost to random I/O performance without decreasing sequential I/O performance. In particular, striping is most commonly done by dividing the storage capacity of each node into storage "zones," and by placing all zones with the same remainder when divided by the number of nodes, into the same node. For example, in a four node cluster such as the cluster 5A, zones 0, 4, 8, 12, 16, etc. are stored in node 0; zones 1, 5, 9, 13, 17 etc. are stored in node 1; zones 2, 6, 10, 14, 18 etc. are stored in node 2; and zones 3, 7, 11, 15, 19 etc. are stored in node 3.

According to embodiments, each storage server computer 2A-2G includes one or more network ports operatively connected to a network switch 6 using appropriate network cabling. It should be appreciated that, according to one implementation disclosed herein, Ethernet or Gigabit Ethernet is utilized. However, it should also be appreciated that other types of suitable physical network connections may be utilized to form a network of which each storage server computer 2A-2G is a part.

The network switch 6 is connected to one or more client computers 8A-8N (also referred to herein as "initiators"). It should be appreciated that other types of networking topologies may be utilized to interconnect the clients and the storage server. It should also be appreciated that the initiators 8A-8N may be connected to the same local area network ("LAN") as the clusters 5A-5B or may be connected to the clusters 5A-5B via a distributed wide area network ("WAN"), such as the Internet. An appropriate protocol, such as the iSCSI or Fiber Channel protocol may be utilized to enable the initiators 8A-8N to communicate with and utilize the various functions of the storage clusters 5A-5B over a wide area network such as the Internet. An appropriate protocol, such as iSCSI, Fiber Channel, or Serial Attached SCSI ("SAS"), is also used to enable the members of the storage cluster to communicate with each other. These two protocols need not be similar.

Turning now to FIG. 2, an illustrative computer hardware architecture for practicing various embodiments will now be described. In particular, FIG. 2 shows an illustrative computer architecture and implementation for each storage node 2. In particular, each storage server computer 2 includes a baseboard 12, or "motherboard," which is a printed circuit board to which a multitude of components or devices may be connected by way of a system bus or other electrical communication path. In one illustrative embodiment, these components include, without limitation, one or more central processing units ("CPUs") 14A-14B, a network adapter, such as the Ethernet controller 16, a system memory, including a Read Only Memory 18 ("ROM") and a Random Access Memory 20 ("RAM"), and other hardware for performing input and output, such as a video display adapter or a universal serial bus port ("USB"), not all of which are illustrated in FIG. 2.

The motherboard 12 may also utilize a system board chipset 22 implementing one or more of the devices described herein. One or more hardware slots 24A-24B may also be provided for expandability, including the addition of a hardware RAID controller to the storage server computer 2. It should also be appreciate that, although not illustrated in FIG. 2, a RAID controller may also be embedded on the motherboard 12 or implemented in software by the storage server computer 2. It is also contemplated that the storage server computer 2 may include other components that are not explicitly shown in FIG. 2 or may include fewer components than illustrated in FIG. 2.

As described briefly above, the motherboard 12 utilizes a system bus to interconnect the various hardware components. The system bus utilized by the storage server computer 2 provides a two-way communication path for all components connected to it. The component that initiates a communication is referred to as a "master" component and the component to which the initial communication is sent is referred to as a "slave" component. A master component therefore issues an initial command to or requests information from a slave component. Each slave component is addressed, and thus communicatively accessible to the master component, using a particular slave address. Both master components and slave components are operable to transmit and receive communications over the system bus. Buses and the associated functionality of master-slave communications are well-known to those skilled in the art, and therefore not discussed in further detail herein.

As discussed briefly above, the system memory in the storage server computer 2 may include including a RAM 20 and a ROM 18. The ROM 18 may store a basic input/output system ("BIOS") or Extensible Firmware Interface ("EFI") compatible firmware that includes program code containing the basic routines that help to transfer information between elements within the storage server computer 2. As also described briefly above, the Ethernet controller 16 may be capable of connecting the local storage server computer 2 to the initiators 8A-8N via a network. Connections which may be made by the network adapter may include LAN or WAN connections. LAN and WAN networking environments are commonplace in offices, enterprise-wide computer networks, intranets, and the Internet. The CPUs 14A-14B utilized by the storage server computer 2 are standard central processing units that perform the arithmetic and logical operations necessary for the operation of the storage server computer 2. CPUs are well-known in the art, and therefore not described in further detail herein. A graphics adapter may or may not be utilized within the storage server computer 2 that enables the display of video data (i.e., text and/or graphics) on a display unit.

As shown in FIG. 2, the motherboard 12 is connected via a backplane 26 and disk controller 28 to one or more mass storage devices. The mass storage devices may comprise hard disk drives 4A-4D or other types of high capacity high speed storage. The mass storage devices may store an operating system suitable for controlling the operation of the storage server computer 2, such as the LINUX operating system. The hard disk drives may also store application programs and virtually any other type of data. It should be appreciated that the operating system comprises a set of programs that control operations of the storage server computer 2 and allocation of resources. The set of programs, inclusive of certain utility programs, may also provide a graphical user interface to a user. An application program is software that runs on top of the operating system software and uses computer resources made available through the operating system to perform application specific tasks desired by the user.

The mass storage devices and their associated computer-readable media, provide non-volatile storage for the storage server computer 2. Although the description of computer-readable media contained herein refers to a mass storage device, such as a hard disk or CD-ROM drive, it should be appreciated by those skilled in the art that computer-readable media can be any available media that can be accessed by the local storage server. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

Turning now to FIG. 3, an illustrative computer software architecture for practicing the various embodiments presented herein will now be described. In particular, FIG. 3 illustrates a storage stack 32 utilized in the embodiments described herein. At the top of the storage stack 32, storage volumes or fileshares are exposed to the initiators 8A-8N. At the bottom of the storage stack 32 are the actual mass storage devices, such as the disks 4A-4D, that are utilized to store the data. The mass storage devices are, in turn, connected to a disk controller, such as a Serial ATA ("SATA") controller 34 or a hardware RAID controller 36. In the case of a SATA controller, a SATA driver 38 may be utilized to access the hardware device. Additionally, a software RAID module 42 may also be utilized to provide RAID services in the absence of a hardware RAID controller 36. A unified RAID management layer 42 may be utilized to simplify the utilization of RAID with either software or hardware implementations.

Above the unified RAID management layer 42 sits a kernel module 44 that implements the functionality described herein. In particular, the kernel module 44 may provide functionality for implementing thin provisioning, virtualization, snapshots, locking, replication, and capacity expansion. These features are implemented by the modules shown in FIG. 3, some of which are described in greater detail herein. In particular, the thin provisioning module 46A provides functionality for allocating physical capacity to logical volumes on an as-needed basis and for provision tracking The snapshots module 46C provides functionality for creating, utilizing, and managing point in time snapshots of the contents of logical storage volumes. The replication module 46E provides functionality for replication within the computer 2. The locking module 46D provides functionality for synchronizing input/output operations in a computer system that utilizes snapshots and thin provisioning. The capacity expansion module 46F is a related component to the virtualization module, and provides functionality for re-striping data across multiple nodes when a new node is added. A chained declustering module (not shown in FIG. 3) may also operate within the kernel module 44 for providing support for chained declustering and for providing the functionality described herein for resynchronizing the nodes.

Above the kernel module 44, a number of software components are utilized depending upon the access mechanism utilized to access the storage cluster of which the storage server computer 2 is a part. In particular, a Storage Area Network ("SAN") path is provided that utilizes a cache 48 and an iSCSI driver 50. A Network Attached Storage ("NAS") path is also provided that utilizes a LINUX cache 52 and the XFS high-performance journaling file system 54. Volumes are exposed through the SAN path while fileshares are exposed through the NAS path. The virtualization module 46B provides functionality for clustering, governing the manner of zoning data amongst various nodes, and specifying how each I/O operation is routed to the several nodes.

It should be appreciated that the kernel module 44 comprises a LINUX-compatible mass storage device driver in one embodiment. However, although the embodiments presented herein are described as being implemented within a LINUX-compatible device driver, the various aspects presented herein may be implemented at different points within the storage stack and in conjunction with other operating systems. For instance, the aspects presented herein may be implemented with the FREEBSD operating system or with the WINDOWS family of operating systems from MICROSOFT CORPORATION of Redmond, Wash. According to embodiments, a management interface 56 may also be provided for controlling and monitoring the functionality presented herein. The management interface communicates with the various layers through software interfaces to retrieve performance data, provide configuration data, and to perform other functions.

Figure 4:
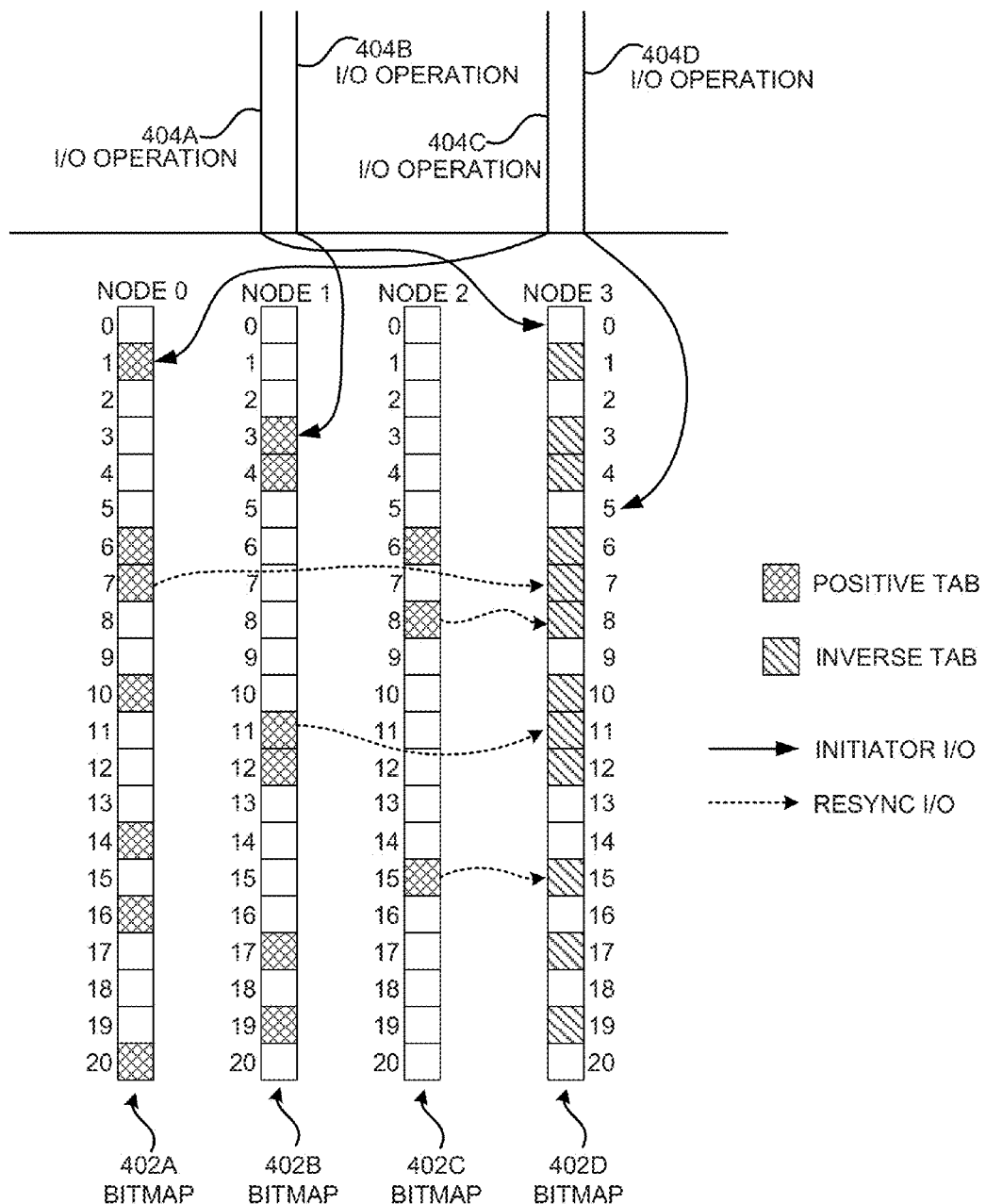
FIG. 4 is a block diagram illustrating aspects of an exception table and data movement in one embodiment described herein.

Referring now to FIG. 4, aspects of one implementation for moving data between the nodes of a storage cluster will be described. Prior to discussing FIG. 4, it should be appreciate that the implementations described herein may be utilized in conjunction with a wide variety of migration operations. In typical storage clusters, these operations include creating a mirror, rebuilding after link failure in a chained declustered array, expanding a cluster by adding a node, contracting a node in the presence of a distributed hot spare, and others.

Several of these migration operations have their basic structure in common: an algorithm for deciding what data to migrate; the source and destination for each sector of data that is to be migrated; one or more threads that perform the actual migration in the background; and the normalization of the cluster once migration has completed.

In most performance and/or high-availability storage systems, any migration operation must necessarily take place in the background, but equally important, the effects of the migration operation should be delivered to the system as quickly as possible. Hence, in most circumstances, it is not acceptable that the effects of migration will be felt in the system only after the entire migration has completed. For example, if the migration operation is the operation of capacity expansion by the addition of a new node to a storage cluster, the expectation of the user is that even though the capacity expansion may take several hours or even days to complete, the additional capacity added by the new node will be available almost immediately (to varying degrees), and the new node will begin fielding I/O operations as soon as possible.

The resynchronization processes for various migration operations, such as capacity expansion, rebuild, contraction, and compaction are slightly different in their details, but for most practical purposes, they are by and large similar. Accordingly, the disclosure presented herein utilizes rebuilding a degraded chained declustered array by a rejoining node as an exemplary case. The operation of rebuild is therefore described below with reference to FIGS. 4 to 6. It should be appreciated, however, that the discussion presented herein is equally applicable to the migration operations of creating a mirror, rebuilding after link failure in a chained declustered array, expanding a cluster by adding a node, contracting a node in the presence of a distributed hot spare, and others. An example wherein data transfer occurs between a set of nodes, and not from one set of nodes to another, is also described below with reference to FIG. 7. This situation may not arise in the rebuild case, but is nonetheless handled effectively by the algorithms described herein.

FIG. 4 illustrates aspects of a four node cluster. In the example shown in FIG. 4, three of the nodes (nodes 0-2) are in the process of rebuilding a fourth node (node 3). The first operation to be performed in the rebuild process is to identify the specific data that needs to be moved out of each node to the node being rebuilt. This identification is done in a manner that is specific to each kind of migration and may be performed by a higher layer in the storage stack. For example, in one implementation, a chained declustering module in the kernel module 44 identifies on each node the sectors that need to be resynchronized. This may be done exhaustively by assuming that all sectors need to be synchronized. This, however, is the least efficient method of resynchronization.

In another implementation, only those portions of a volume that have been written are resynchronized. This implementation has the advantage of limiting the total size of migrated data by the amount of capacity consumed, instead of the amount of capacity available. However, this method also has its disadvantages, since not all of the data may be out of synchronization.

In another implementation, the set of sectors that are to be synchronized is maintained dynamically by each node after each node has discovered that another node has failed. From the time a node has discovered that another node has failed, all new write operations result in sectors becoming out of synchronization. These writes, therefore, are recorded in a data structure provided herein. This data structure is called the exception table (also referred to herein as the "tab"). It should be appreciated that even when the exception tables are utilized a full resynchronization may be required if the node rejoining the cluster is a totally new node installed because the previous node was physically destroyed or otherwise made unusable.

According to one implementation, an exception table is maintained by each node for each volume present on the node. In order to limit the amount of memory consumed for the exception tables to a realistic value, the granularity at which the state of synchronization is maintained is allowed to be substantially larger than the sector size. For example, the exception tables may be maintained at a granularity of 64 kB. This reduces the amount of memory required for the exception tables. The advantage of a small chunk size is that it conserves bandwidth, since it gives finer control over exactly how much data needs to be transferred. However, its disadvantage is that it requires a large amount of memory to store the exception tables.

Another drain on memory that is presented by the exception tables in certain systems, such as systems supporting thin-provisioned volumes, is a result of the fact that the amount of virtual space presented is often much larger than the amount of physical space that is present. Since the exception tables must be maintained at the virtual space (being a property of each volume), a large amount of memory is reserved for exception tables that will most likely not have all sections even valid, thereby rendering the question of whether a chunk is valid or not a moot point. In such cases, the exception table is maintained instead at a slightly different level, allocated on demand, and looked up through a memory pointer table. Other methods may also be utilized to decrease the amount of memory utilized by the exception tables.

According to one implementation, the exception table for each volume may be implemented as a bitmap. For instance, FIG. 4 illustrates the bitmaps 402A-402D for the nodes 0-3, respectively. Each of the bits of the bitmaps 402A-402D corresponds to an area of the volume of a predetermined size. For instance, in the example shown in FIG. 4, the size of the volume being rebuilt is assumed to be 21 chunks. There are, correspondingly, 21 bits in each of the exception table bitmaps 402A-402D. On the first three nodes (nodes 0-2), the bits represent positive tabs. Positive tabs are bits which, when set, indicate that the corresponding data should be moved to another node. In the rebuild example shown in FIG. 4, positive tabs indicate that the corresponding data should be moved to the newly reconstituted node (node 3). On the new node, the bits represent inverse tabs. Inverse tabs are bits which, when set, indicate that the corresponding data should be migrated to the node from other another node. In the rebuild example shown in FIG. 4, the exception table bitmap for the newly reconstituted node (node 3) includes inverse tabs for each chunk that is to be migrated from the nodes 1-2. Hence, positive tabs are utilized to identify data that is valid but that needs to be migrated to another node. Inverse tabs are utilized to identify data that is invalid until it has been migrated from another node.

The example shown in FIG. 4 corresponds to a chained declustered system that is degraded because one node has failed. The failed node has been repaired, and is now rejoining the system. The rejoining node (node 3) must be resynchronized with the other nodes (nodes 0-2). The chunks that need to be resynchronized are tabbed by a chained declustering module executing within the kernel module 44, which is the higher layer utilizing the tab. The exception tables may be generated continuously by the other nodes in the system from the time the failed node went down. Each node is responsible for tabbing the I/O operations that it shares with the failed node. Hence, just before the new node is to be brought up again, each of the other nodes has created an exception table that identifies all of the chunks that are out of synchronization between the node and the new node. Following the creation of the exception tables by the non-failing nodes, the new node is notified about the exception tables so that it can create its negative tab.

Once the exception tables have been generated, a resynchronization thread is then started in the background on each of the source nodes to migrate the data identified by the exception tables. The resynchronization thread utilizes the contents of the exception tables to migrate data between the nodes. For instance, in the example shown in FIG. 4, chunk 7 of node 0 is migrated to node 3, chunk 8 is migrated from node 2 to node 3, chunk 11 is migrated from node 1 to node 3, and chunk 15 is migrated from node 2 to node 3. Other tabbed areas of the nodes 0-2 may also be migrated to the node 3. The mechanism by which chunks are migrated between nodes is discussed further below with reference to FIG. 4.

According to one embodiment, the exception tables provides a mechanism by which the newly added node may begin fielding I/O operations as soon as the node has been added back to the cluster. This is because, in addition to using the exception tables to specify which sectors must be resynchronized, the source and destination nodes also interpret the tab in different ways to allow the new node to field I/O operations wherever doing so will not result in loss of data integrity. For example, when an I/O operation arrives at a node other than the new node that is directed to a location that is not tabbed, the receiving node may confidently reroute this I/O operation to the new node, since the sector is not waiting for resynchronization from any other node.

In another example, if the new node receives an I/O operation directed to a location that is tabbed, this I/O operation must not reach the new node; on the contrary, it must reach the node where the sector is going to be resynchronized from, that is, the node in which the sector resided before the new node rejoined the cluster. Similarly, if an I/O operation arrives to the new node to a chunk that is tabbed, the I/O operation must not be fielded locally (lest data integrity be compromised by the resynchronization overwriting newer data). Such an I/O operation must be rerouted to the node that would have fielded it had the new node not joined yet. However, if the new node receives an I/O operation that is to be fielded by it under normal circumstances, and for which the corresponding exception table bit is not set, the I/O operation is fielded locally in the new node as though migration was not happening.

More generally stated, when an I/O operation arrives to a tabbed chunk, it is presumed that the I/O operation must be fielded as though the migration operation has not yet been initiated. If an I/O operation arrives to a chunk that is not tabbed, it must be fielded as though the migration operation has been completed entirely for that chunk. This is true for migration operations that are the result of rebuild, expansion, contraction, mirror creation, or any other similar process. Thus, the presence of the tab on the destination node has a meaning that is slightly different from the presence of the tab on the source node. In the destination node, when a bit is tabbed, it indicates that the I/O operation is not to be fielded locally; instead, it is to be given to one of the other nodes (most often the other node which also has the tab bit set), where it may be fielded.

The example shown in FIG. 4 also summarizes the handling of I/O operations arriving at the cluster just after resynchronization has started, but much before it has completed. These I/O operations are shown as arriving to old nodes (nodes 0-2) and the new node (node 3), arriving both at tabbed bits and at untabbed bits. In the example shown it is assumed that node 3 owns all the demonstrated I/O operations, and would have fielded all the I/O operations locally had the node not failed. The I/O operation 404A, for example, arrives to (old) node 1 to an untabbed bit. This I/O operation should have been fielded by node 3 in the normal scheme of things. Since the bit is untabbed, the corresponding chunk need not be resynchronized to node 3 from node 1, and as a result, it is redirected to node 3 where it the I/O operation is fielded.

The I/O operation 404B, on the other hand, has arrived at a tabbed location (i.e. chunk 3 of the node 1). Because the chunk is tabbed, it is fielded as though node 3 is still down (though it is alive, the fact that the chunk is tabbed indicates that it has not yet been resynchronized, and node 3 therefore contains an out-of-date copy of the chunk till it has been synced). This entails fielding the I/O operation 404B locally at node 1. Similarly, the I/O operations 404C and 404D arrive at node 3. The I/O operation 404C is an I/O operation directed to chunk 1, which is currently tabbed in node 3 (inverse tab). Node 3, therefore, interprets this as meaning that the I/O operation 404C should not be fielded locally. Instead, the I/O operation 404C should be fielded by the node that would have fielded the I/O operation 404C had node 3 still been down. Hence, the I/O operation 404C is redirected to node 0, where it is fielded. The I/O operation 404D, on the other hand, is arriving at a chunk that is not tabbed. Consequently, the I/O operation 404D is fielded as a local I/O operation by the node 3.

Figure 5:
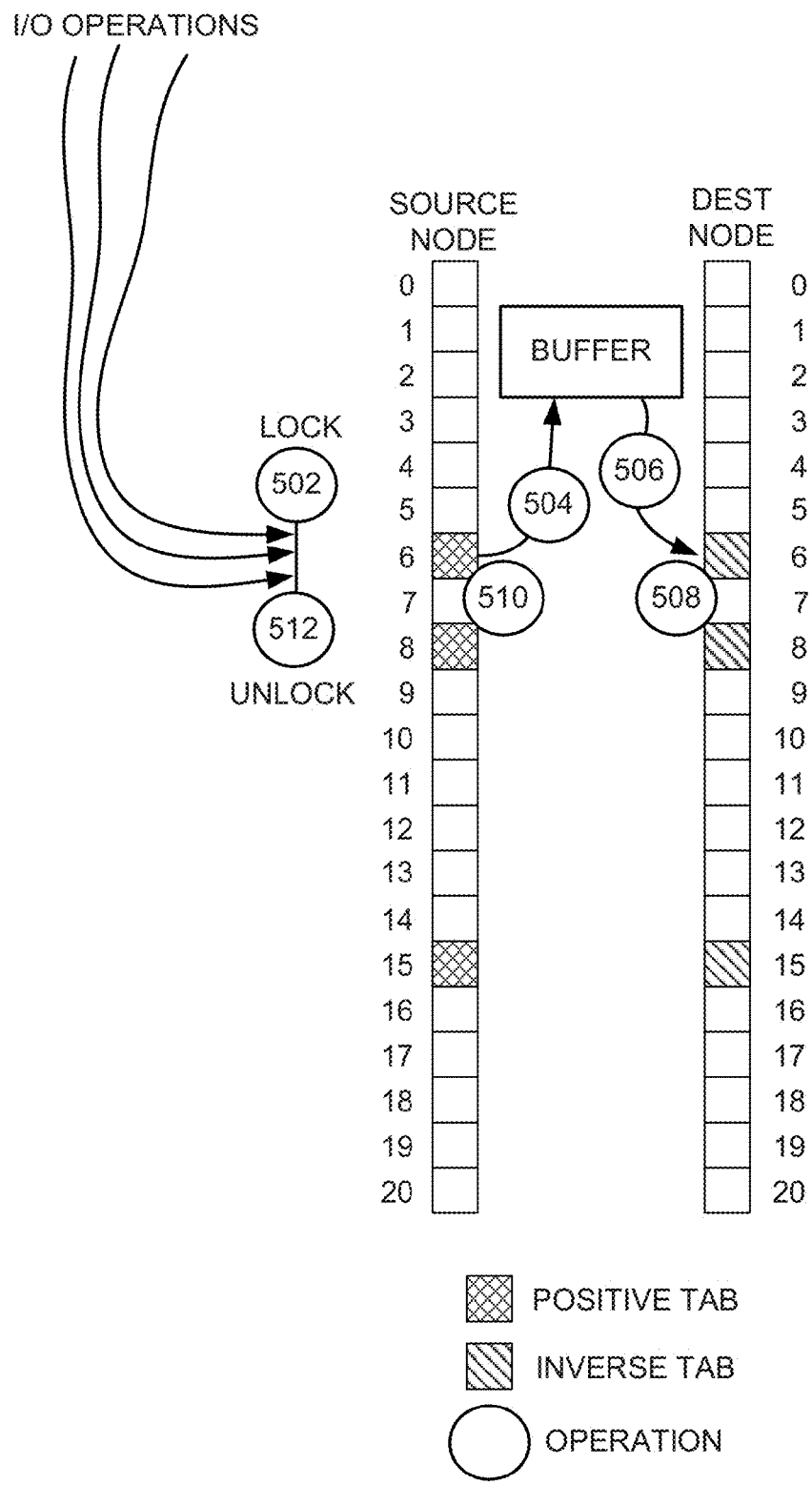
FIG. 5 is a block diagram showing one illustrative process of migrating data from a source storage node to a destination storage node in one implementation described herein.

FIG. 5 provides additional details regarding the process of migrating data between nodes in one implementation provided herein. As will be described in detail below, according to this implementation, distributed locking is not required for any chunk. Moreover, the resynchronization of each chunk is independent. Therefore a multi-processor CPU will be able to spawn several threads, each resynchronizing a different portion of the tab. This provides tremendous scalability to the resynchronization operation for computer systems having multiple CPUs.

In the example shown in FIG. 5, chunk 6 of a source node is being migrated to a destination node by a resynchronization thread that is executing in the background. As known to those skilled in the art, background execution refers the execution of a process or thread with a lower priority than other concurrently executing processes. The processing shown in FIG. 5 begins at operation 502, where chunk 6 is locked on the source node. It is not necessary to lock the chunk on the destination node because the chunk is tabbed at the destination node. Because chunk 6 is tabbed at the destination node (inverse tab), all I/O operations arriving at the destination node directed to chunk 6 will, by default, be reshipped to the older node, viz. the source node. Chunk 6 must be locked on the source node, however, because I/O operations happening simultaneously during the rebuild of the chunk could result in some old data being copied to the node being rebuilt. This lock queues any new I/O operations directed to chunk 6, and is granted only after all outstanding I/O operations on the chunk have been completed.

Once the chunk to be migrated has been locked, the resynchronization thread reads the chunk from the source node into a buffer. This occurs at operation 504. After the local read operation has been performed, the data in the buffer is sent to the destination node and written there at operation 506. The process of writing in a tabbed area of the destination node from the source node indicates to the destination node that it is being synchronized. Once this write completes, the destination node will remove its tab for the chunk. This occurs at operation 508. Removal of the tab for the chunk indicates to the destination node that it can field any new I/O operations directed to the chunk from then on.

When the source node receives the write completion, it will also remove its tab at operation 510. In response thereto, the source node releases the lock on the chunk at operation 512. The releasing of lock may be a special operation for certain kinds of resynchronization operations. For example, during expansion of a cluster, the node that is moving the data will no longer have the data stored locally and may therefore send a signal to all I/O operations waiting behind the lock to recompute the node to which they are directed.

After the algorithm described above has been iterated over all the chunks that need to be resynchronized in all the volumes and all the nodes involved, resynchronization is complete. Once resynchronization has been completed, the new node takes up its normal role in the cluster. It should be appreciated that it is also necessary to bring the cluster to a stage where the resynchronization thread may run uninterrupted. This generally involves the process of validating, setting up and sharing the exception tables, as well as the operation of initiating the resynchronization threads. FIGS. 6A-6E illustrate these various stages.

In some implementations, the I/O operations of FIG. 5 cannot wait beyond a certain timeout period to complete at the target side. The timeout period, $T_{initiator}$, may be configured on the initiators 8A-8N and is used as part of a decision process to determine that that the target node has failed and that a recovery action should be started. For example, the timeout value $T_{initiator}$ may be configured to be 60 seconds, after which the initiator will consider a node as failed. Thus, in some implementations, instead of the lock being maintained until the move of the chunk is complete, as described above, a queued I/O operation may have an associated second timeout, $T_{target}$, that is less than the initiator timeout $T_{initiator}$ (i.e., $T_{target} < T_{initiator}$, where $T_{target}$ is, e.g., 45 seconds).

In operation, when the $T_{target}$ timeout is reached, the queued I/O operation will be executed in the source node, even if the move is not complete. The move of the particular chunk that is locked will be cancelled, and the positive and negative tab bits will not be cleared. This serves to signal that the chunk is still to be moved. The background thread will continue with other chunk movements and will revisit this chunk at a later time (e.g., when it finishes one cycle on all the zones). In some implementations, the $T_{target}$ timeout period may be started when the lock is acquired on a zone containing the chunk, or when the first I/O lands on the locked zone containing the chunk (the latter will reflect the timeout on the initiator). As such, these implementations avoid timeout detection by the initiator side due to $T_{initiator}$ being reached, as well as the associated unnecessary recovery actions and performance degradation.

FIG. 6A illustrates the initial creation of the exception tables for two nodes. As discussed briefly above, the initial exception tables may be created from scratch (locking I/O operations wherever appropriate). Alternately, the exception tables may be created dynamically, in response to the detection of failing I/O operations. In one implementation, the nodes are placed into a "tabbing" mode once the failing node has been detected as having failed by the other nodes. In this mode, positive tabs are created indicating that chunks that should be migrated to the failing node when it is returned to service. For instance, in FIG. 6A, the tab has been set for chunks 1 and 6 of node 0 and chunks 3 and 9 of node 1.

FIG. 6B illustrates the gathering of the tab from the new node. This operation is performed because there may also be tabbed bits in the rejoining node. This may be because the new node had outstanding I/O operations on it when it went down that were written to disk without the knowledge of the other nodes. In such a situation, these incomplete writes must also be resynchronized, and there is a partial tab on the new node also. In other words, the burden of knowing which chunks are to be resynchronized is shared by the nodes that are up, as well as by the node that is down. Thus, when the failed node is rejoining the cluster, its first step is to merge the information present in these two tabs, and generate a cumulative tab of all the chunks that need to be merged. The new node will send its tabs of the invalidated I/O operations to its peers. The peers will merge these tabs in their own respective tabs, as these data must also be sent to the new node that is joining. In the example shown in FIG. 6B, the node 2 is informing nodes 0 and 1 about the tab set for chunk 5 on node 2.

Following the performance of the operations shown in FIG. 6B, the tabs in the first three nodes represent a positive tab of all chunks that need to be synchronized. After these operations have completed, the operations illustrated in FIG. 6C are performed whereby nodes 0 and 1 send their own tabs to the node 2. Node 2 utilizes this information to create an inverse tab that identifies the chunks that the node does not own. Once this handshake has been performed, any I/O operation directed toward nodes 0 or 1 where the tab is set will be fielded locally, while an I/O operation directed to a non-tabbed chunk must be mirrored, as explained previously with respect to FIG. 4.

The next operation, after the creation of the exception tables, is to start the resynchronization thread in the background. This is illustrated in FIG. 6D. There may be one or more resynchronization threads, and each resynchronization thread may have any number of I/O operations outstanding, depending on the amount of traffic that the thread is allowed to use. Allowing these parameters to be tunable is important because it may be necessary for the user to determine a priority for resynchronization. Setting a high priority allows each thread to complete faster; setting a low priority successfully prevents a thread from affecting normal I/O performance drastically. The ability to keep the resynchronization priority tunable at a very fine granularity is a consequence of the resynchronization algorithm described in this patent, in which the resynchronization of each chunk is independent of another chunk. Hence, an effective and optimal tuning parameter is the number of simultaneous outstanding chunks that are being resynchronized at any point of time.

As shown in FIG. 6D, when I/O operations are directed toward node 2 during resynchronization, the I/O operations are forwarded to the appropriate node depending upon whether the inverse tab is set at node 2. For instance, the I/O operation 602A is directed toward chunk 0 on node 2. Because the tab for chunk 2 is not set on node 2, the I/O operation 602A is handled by node 2. The I/O operation 602B is directed toward chunk 5 on node 2, which does have its tab set. Accordingly, the I/O operation 602B is redirected to node 0, where it is fielded. Similarly, the I/O operation 602C is directed toward chunk 3 on node 2, which also has its tab set on node 2. Accordingly, this operation is handled by node 1. The I/O operation 602D is fielded locally by node 2 because chunk 2 does not have its tab set on node 2.

Once the resynchronization has completed, and all tabs have been cleared, the new node becomes a part of the cluster. Accordingly, I/O operations directed toward the new node are fielded directly by the new node. For instance, in FIG. 6E, the same I/O operations 602A-602D discussed above with reference to FIG. 6C have been directed toward node 2. In this case, because the tab is not set on node 2, each of the I/O operations 602A-602D are fielded directly by the node 2 rather than being redirected to another node for handling.

Figure 7:
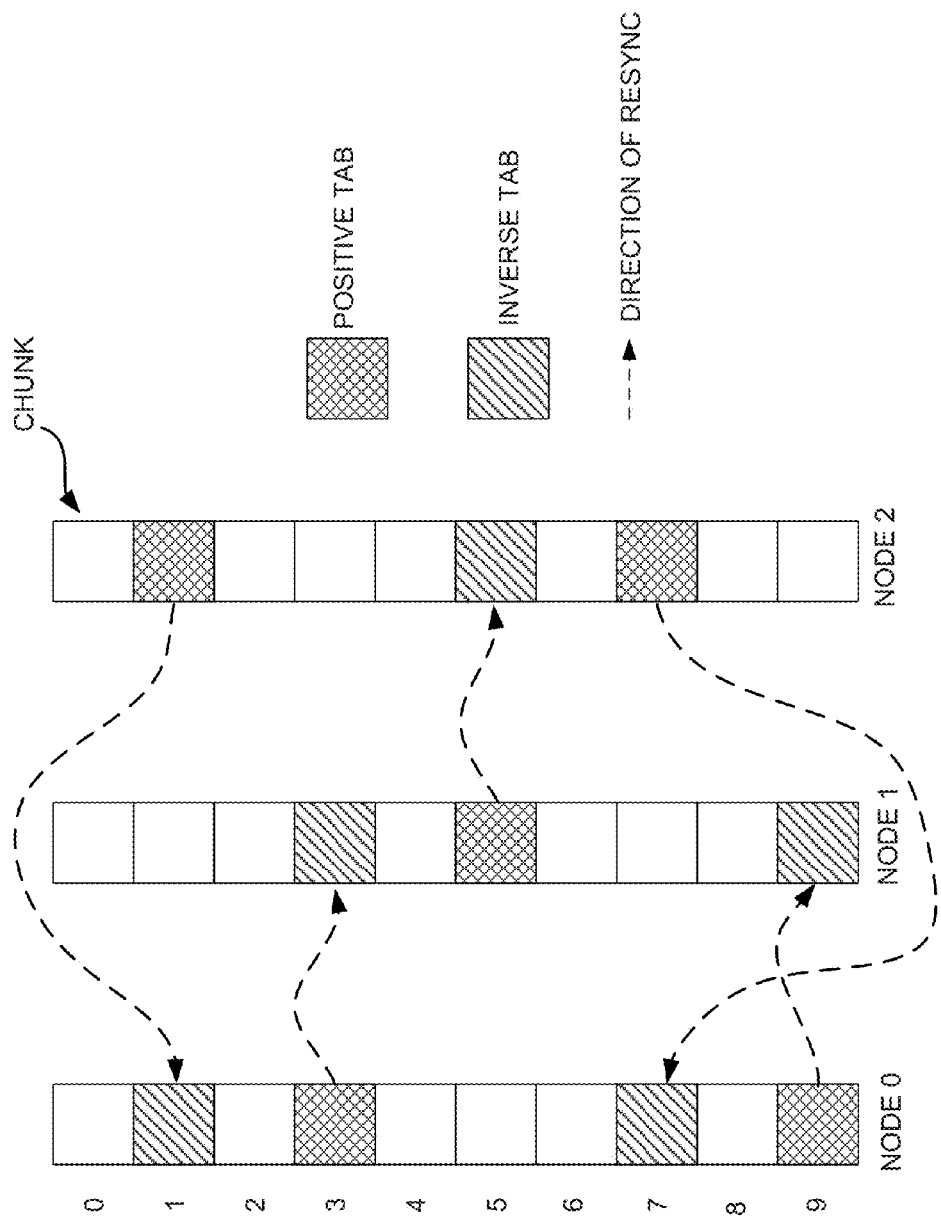
FIG. 7 is a block diagram illustrating aspects of a storage cluster in which storage nodes may contain both positive and inverse tabs in order to move data between the storage nodes.

The algorithms described above, with respect to FIGS. 4-6, made the implicit assumption that there was only one node that was the destination of I/O operations, and that there were many nodes that were the source. It is important to note that this is, in fact, not a binding restriction, as illustrated in FIG. 7. In particular, FIG. 7 shows that the same node may be the source as well as the destination for resynchronization for different chunks. For example, in node 1, chunks 3 and 9 are current and node 1 is the resynchronization source. Chunks 1 and 7 of the node 1, however, are out-of-date and node 1 is the destination. This situation may arise in several scenarios, including capacity contraction and defragmentation/compaction operations.

This situation illustrated in FIG. 7 is handled in a manner similar to that described above utilizing positive and inverse tabs. If this differentiation of tabs is made at the level of a chunk, i.e. each chunk is identified as a positive or inverse tab instead of the entire node being a uniform tab type, then the process of resynchronization is identical regardless of which nodes are the sources of resynchronization and which are the destinations. The direction of resynchronization is always in the direction of positive tab to inverse tab, and the meanings of the positive tab and inverse tab remain the same as their meanings described above with respect to FIG. 4. After a chunk has been migrated, its tab bits are reset as described above, regardless of whether it is a positive or inverse tab. Once the resynchronization of all chunks has completed, the cluster may operate in a normal fashion.

Figure 8:
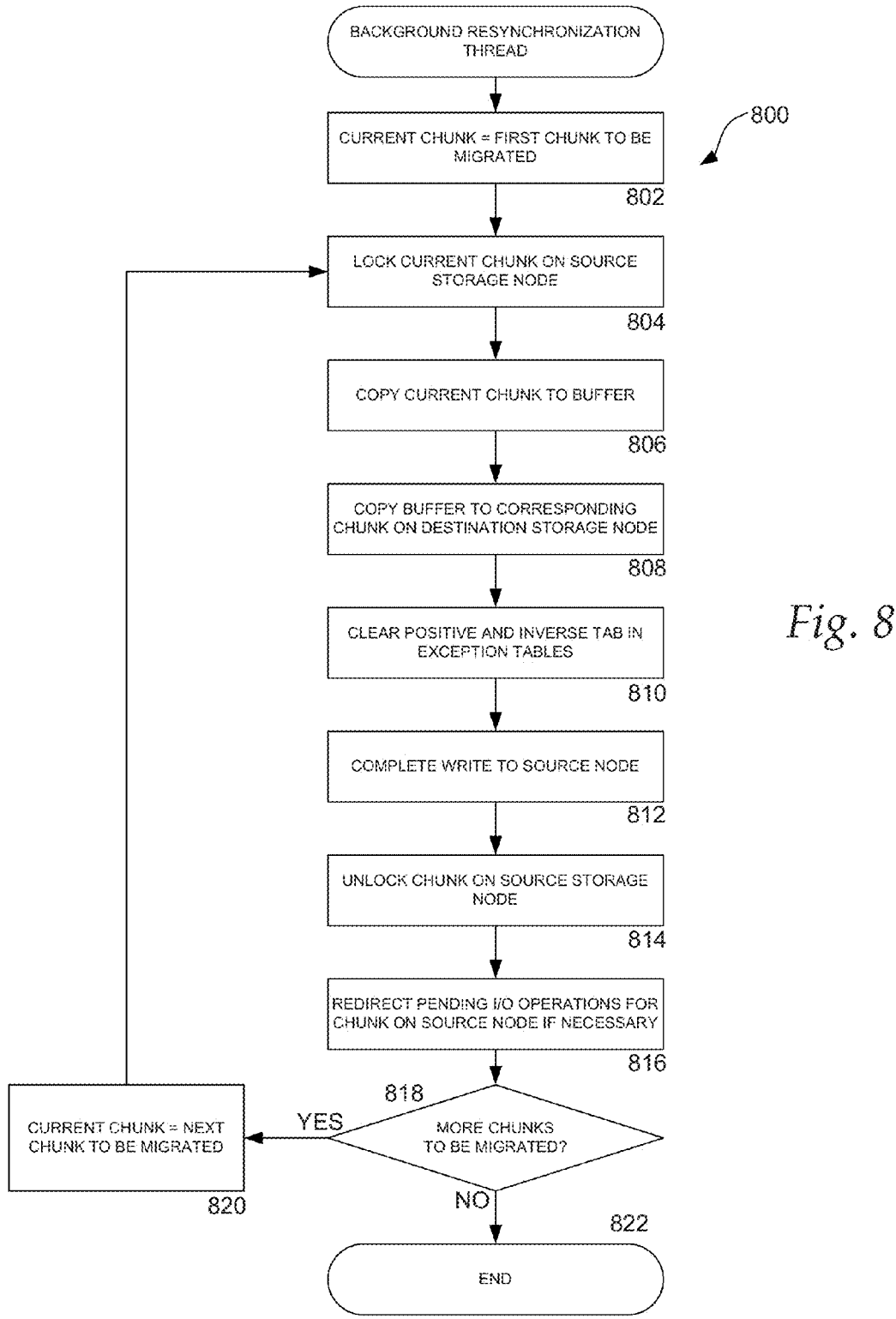
FIG. 8 is a flow diagram illustrating the operations performed by a background synchronization thread in one implementation described herein.

Referring now to FIG. 8, a routine 800 will be described that illustrates the processing of the background thread in one implementation. It should be appreciated that the logical operations of the various embodiments presented herein are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the embodiments described herein. Accordingly, the logical operations described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

The routine 800 begins at operation 802, where the background thread utilizes the exception tables to identify the first chunk of data to be migrated. Once the first chunk has been identified, the routine 802 continues to operation 804, where the chunk to be migrated is locked on the source storage node. As discussed above, this serves to queue I/O operations for the chunk until after the migration has been completed. Once the chunk has been locked, the routine 800 continues to operation 806, where the contents of the chunk are copied to a buffer. At operation 808, the contents of the buffer are copied to the corresponding area on the destination storage node.

From operation 808, the routine 800 continues to operation 810, where the positive tab is cleared at the source node and the inverse tab is cleared on the destination node. In this manner, the chunk is indicated at both nodes as not needing to be migrated. From operation 810, the routine 800 continues to operation 812, where the write operation is completed to the source node. In response thereto, the chunk is unlocked at the source node at operation 814. At operation 816, any pending I/O requests for the chunk at the source node may be redirected, if necessary. For instance, the I/O requests may be redirected to the destination node if the chunk is no longer valid at the source node.

From operation 816, the routine 800 continues to operation 818 where a determination is made based on the contents of the exception table as to whether additional chunks remain to be migrated. If so, the routine 800 branches to operation 820 where the next chunk to be migrated is identified and selected as the current chunk. From operation 820, the routine 800 returns to operation 804, described above. If no additional chunks remain to be synchronized, the routine 800 continues from operation 818 to operation 822, where it ends.

Figure 9:
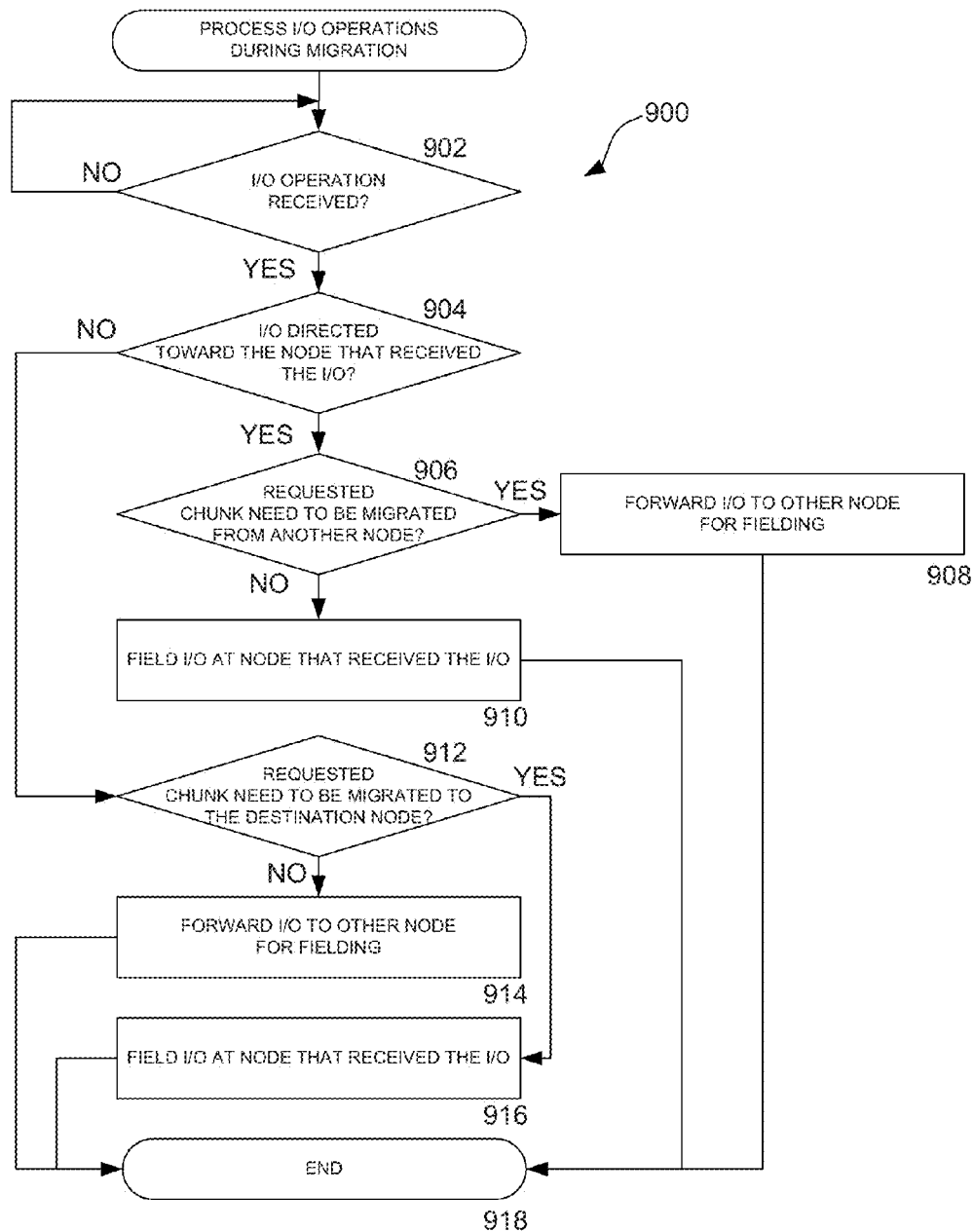
FIG. 9 is a flow diagram illustrating the processing of I/O operations received during the execution of the background thread in one implementation described herein.

Turning now to FIG. 9, a routine 900 will be described illustrating the processing of I/O operations received at a storage cluster during migration. In particular, the routine 900 begins at operation 902, where a determination is made as to whether an I/O operation has been received at one of the storage nodes in the storage cluster. When an I/O operation has been received, the routine 900 continues from operation 902 to operation 904. At operation 904, the node that received the I/O request makes a determination as to whether the request is for a chunk located at the node or at another node in the cluster. If the request is for a chunk local to the receiving node, the routine 900 continues from operation 904 to operation 906. If the request is for an area on another node in the cluster, the routine 900 branches from operation 904 to operation 912.

At operation 906, a determination is made as to whether the requested chunk needs to be migrated from another node. This is accomplished by examining the inverse tab for the receiving node. If the chunk needs to be migrated from another node, the node that received the request cannot field the I/O. Instead, the I/O operation is shipped to the node from which the data will be migrated at operation 908. In this manner, the node with valid data for the chunk is given the opportunity to field the I/O request. If the requested chunk is not tabbed at the receiving node, the node can field the request directly. This occurs at operation 910.

As mentioned above, if the I/O request is for an area located on a node other than the node that received the I/O, the routine 900 branches from operation 904 to operation 912. At operation 912, a determination is made as to whether the requested chunk needs to be migrated to the node that is the destination of the I/O. This is accomplished by examining the positive tab for the receiving node. If so, the destination node does not have valid data for the requested chunk. Accordingly, in this case the I/O is fielded locally by the node that received the I/O at operation 916. If the requested chunk does not need to be migrated to the destination node, the I/O operation is shipped to the destination node for fielding at operation 914. From operations 908, 910, 914, and 916, the routine 900 continues to operation 918, where it ends.

Figure 10A:
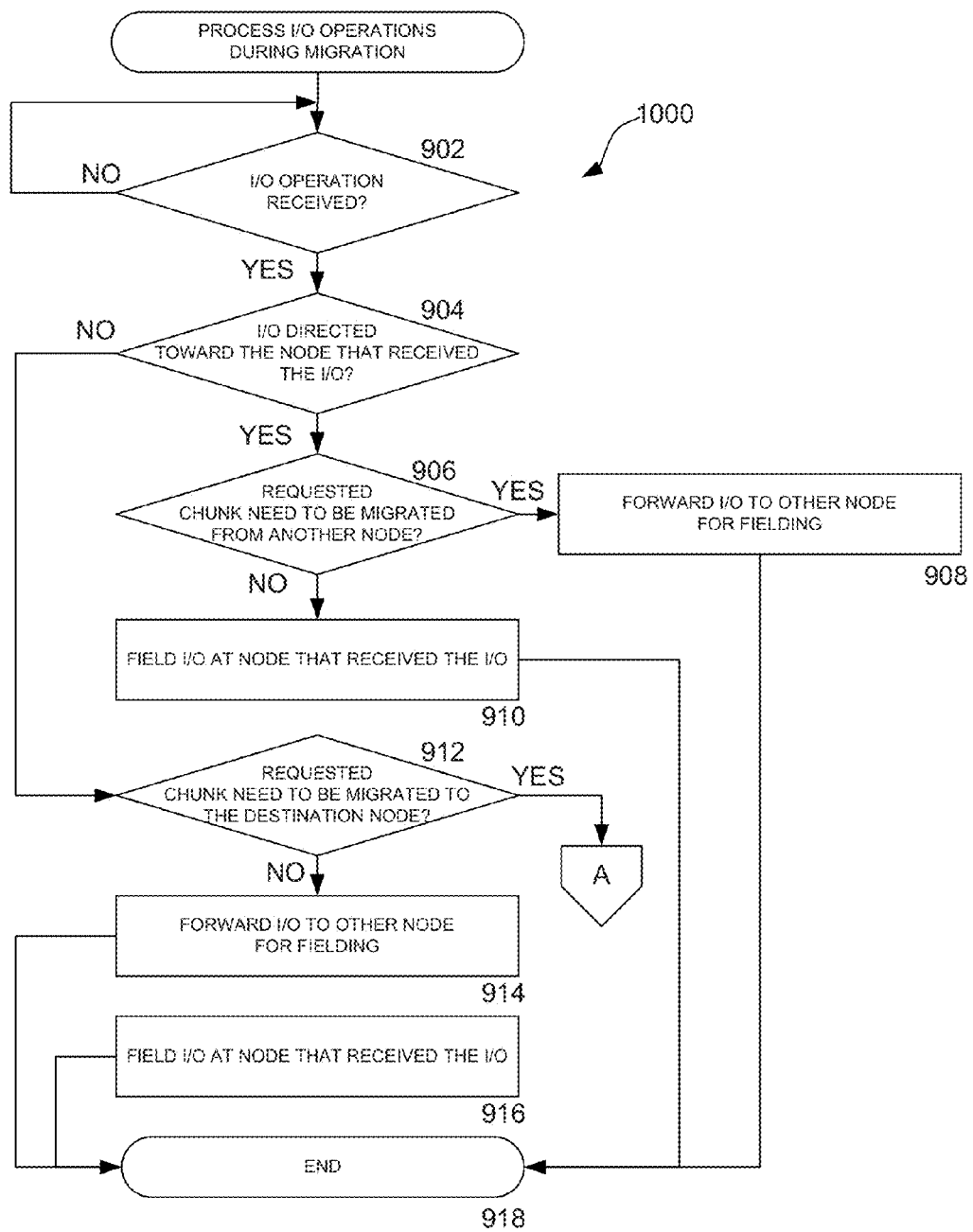
FIGS. 10A and 10B are flow diagrams illustrating the processing of I/O operations received during the execution of the background thread in another implementation described herein.
Figure 10B:
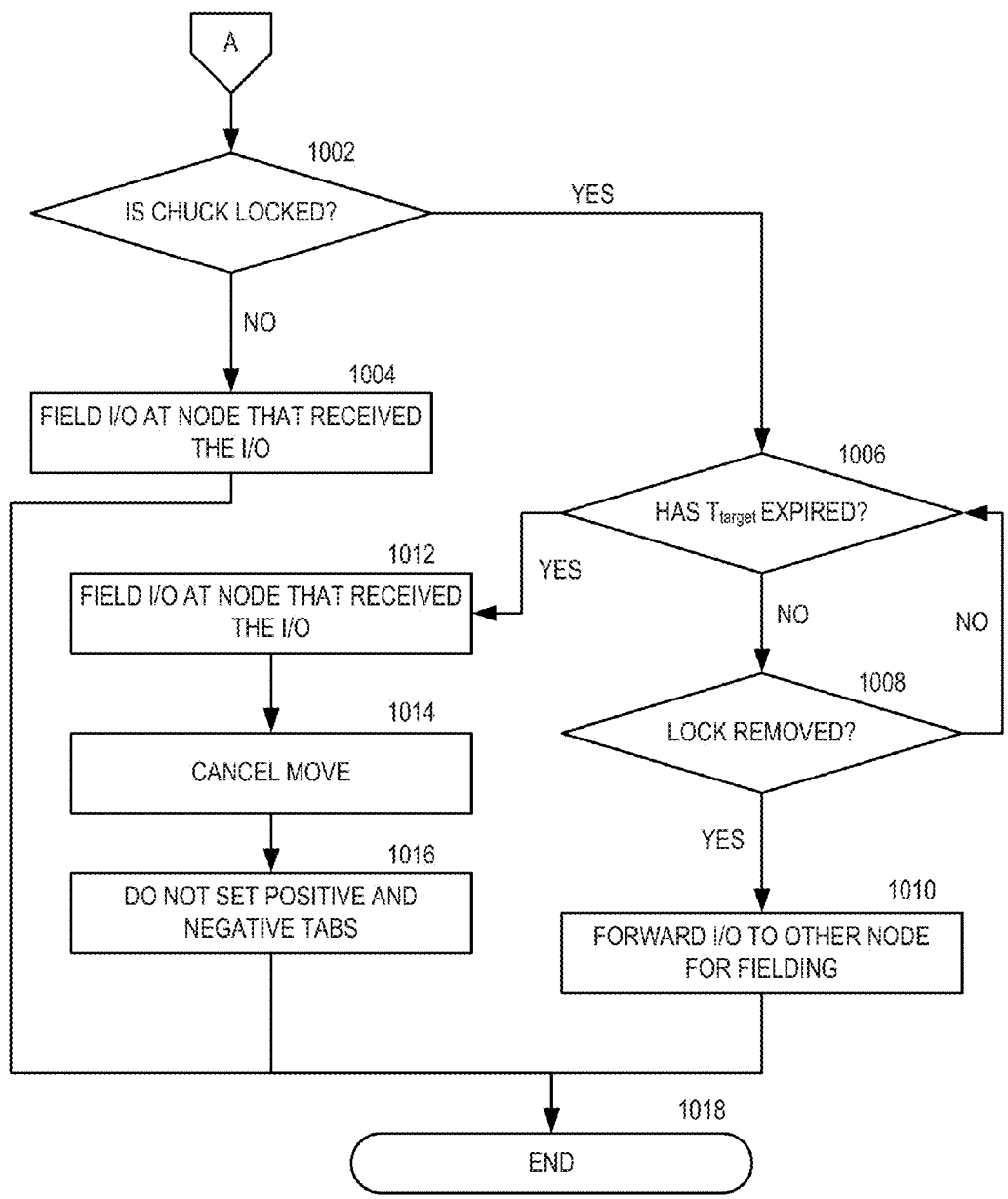

Turning now to FIGS. 10A and 10B, a routine 1000 will be described illustrating the processing of I/O operations received at a storage cluster during migration. The routine 1000 and operations 902-918 substantially flow as described above with reference to FIG. 9, with the exception of operation 912, and will not be described again. At operation 912, a determination is made as to whether the chunk requested by the I/O operation needs to be migrated to the node that is the destination of the I/O. This is accomplished by examining the positive tab for the receiving node (e.g. the source node). If so, the destination node does not have valid data for the requested chunk. In this case, the flow branches to operation 1002 (FIG. 10B), where it is determined if the requested chuck is locked.

If not, then the I/O is fielded locally by the node that received the I/O at operation 1004 because the chuck has yet to be migrated to the destination node. The process then ends at operation 1018.

If the chuck is locked, then $T_{target}$ is examined at operation 1006 to see if the $T_{target}$ timeout period has expired. As noted above, the $T_{target}$ timeout period may be started when the lock is acquired on a zone having the requested chunk, or when the first I/O lands on the locked zone having the requested chunk. If the $T_{target}$ timeout period has not expired, then at operation 1008, it is determined if the lock has been removed. If so, then at operation 1010, the I/O operation is forwarded to the other node (e.g., the destination node) for fielding. If the lock has not been removed, the flow returns to operation 1006 to determine if the $T_{target}$ timeout period has expired. If, at operation 1006, the $T_{target}$ timeout period has expired, then at operation 1012, the node that received the I/O request fields the request (i.e., the source node). At operation 1014, the move of the chunk is canceled and at operation 1016, the positive and negative tab bits are not cleared, signaling that the having the requested chunk is still to be moved. At operation 1018, the process ends.

Although the embodiments presented herein have been described in language specific to computer structural features, methodological acts, and computer readable media, it is to be understood that the invention defined in the appended claims is not necessarily limited to the specific structures, acts or media described. Therefore, the specific structural features, acts and mediums are disclosed as exemplary embodiments implementing the claimed invention. Moreover, it should be appreciated that, according to the embodiments of the invention, the software described herein has been implemented as a software program executing on a server computer. Alternatively, however, the software operations described herein may be performed by a dedicated hardware circuit, by program code executing on a general-purpose or specific-purpose microprocessor, or through some other combination of hardware and software.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A method for processing I/O requests received when moving data between nodes of a storage cluster, the method comprising:
   starting a first timeout period at an initiator of an input/output (I/O) operation;
   receiving the I/O operation at a source node having one or more areas, the I/O operation being directed to a target node having one or more areas corresponding to the one or more areas of the source node, the I/O operation requesting an area that is locked by a resynchronization process;
   starting a second timeout period during which the I/O operation received at the source node and directed to the target node is fielded at the target node when the requested area is not locked by the resynchronization process;
   determining if the second timeout period has expired;
   if the second timeout period has expired before fielding the I/O operation at the target node, fielding the I/O operation at the source node;
   canceling a data migration process associated with the area locked by the resynchronization process; and
   leaving positive and negative tabs associated with the area of the source node and the target node in an unset state.

2. The method of claim 1, further comprising starting the second timeout period when a lock is acquired on a zone containing the area, or when a first I/O operation lands on the zone containing the area.

3. The method of claim 1, wherein the second timeout period is less than the first timeout period.

4. The method of claim 1, further comprising forwarding the I/O operation to the target node if the lock is removed before the second timeout period expires.

5. The method of claim 1, further comprising receiving an I/O operation at the source node, the I/O operation being directed to the target node and requesting an area that is not locked by the resynchronization process; and
   fielding the I/O operation that requests the area that is not locked at the source node such that the area will be subsequently migrated by the resynchronization process.

* * * * *